(12) United States Patent
Liu et al.

(10) Patent No.: US 7,535,422 B2
(45) Date of Patent: May 19, 2009

(54) NOTEBOOK AND ANTENNA STRUCTURE THEREOF

(75) Inventors: Chih-Kai Liu, Taipei (TW); Kai-Hong Cheng, Taipei Hsien (TW)

(73) Assignee: Wistron NeWeb Corp., Taipei Hsien (TW)

( * ) Notice: Subject to any disclaimer, the term of this patent is extended or adjusted under 35 U.S.C. 154(b) by 180 days.

(21) Appl. No.: 11/324,048

(22) Filed: Dec. 31, 2005

(65) Prior Publication Data

US 2007/0040754 A1 Feb. 22, 2007

(30) Foreign Application Priority Data

Aug. 16, 2005 (TW) .............................. 94127906 A (51) Int. Cl.
*H01Q 1/24* (2006.01)
(52) U.S. Cl. .................. 343/702; 343/700 MS
(58) Field of Classification Search .......... 343/700 MS, 343/702, 846, 848
See application file for complete search history.

(56) References Cited

U.S. PATENT DOCUMENTS 6,624,789 B1 * 9/2003 Kangasvieri et al. ........ 343/702
6,717,551 B1 * 4/2004 Desclos et al. ........ 343/700 MS
6,812,892 B2 * 11/2004 Tai et al. ................ 343/700 MS
6,992,627 B1 * 1/2006 Honda et al. .......... 343/700 MS
7,050,010 B2 * 5/2006 Wang et al. .................. 343/702
7,084,831 B2 * 8/2006 Takagi et al. ................. 343/860
7,136,022 B2 * 11/2006 Sato et al. .................... 343/702
2004/0090375 A1 * 5/2004 Dai et al. ............... 343/700 MS
2004/0113848 A1 * 6/2004 Gaucher et al. ............. 343/702
2005/0110692 A1 * 5/2005 Andersson ................... 343/702
2006/0262016 A1 * 11/2006 Hung et al. .................. 343/702

FOREIGN PATENT DOCUMENTS

TW M258432 3/2005

* cited by examiner

*Primary Examiner*—HoangAnh T Le
(74) *Attorney, Agent, or Firm*—Quintero Law Office (57) ABSTRACT

An antenna structure includes a ground element, a first transmitting element and a second transmitting element. The first transmitting element transmits a first wireless signal, and comprises a first connecting portion and a first radiation portion. The first connecting portion is connected to the ground element and the first radiation portion. The second transmitting element transmits a second wireless signal and comprises a second connecting portion and a second radiation portion. The second connecting portion is connected to the ground element and the second radiation portion. The second connecting portion is shorter than the first connecting portion, and the second radiation portion is shorter than the first radiation portion.

22 Claims, 12 Drawing Sheets

NOTEBOOK AND ANTENNA STRUCTURE THEREOF

BACKGROUND OF THE INVENTION

1. Field of the Invention

The invention relates to an antenna structure and in particular to an antenna structure transmitting a plurality of wireless signals.

2. Description of the Related Art

Figure 1:
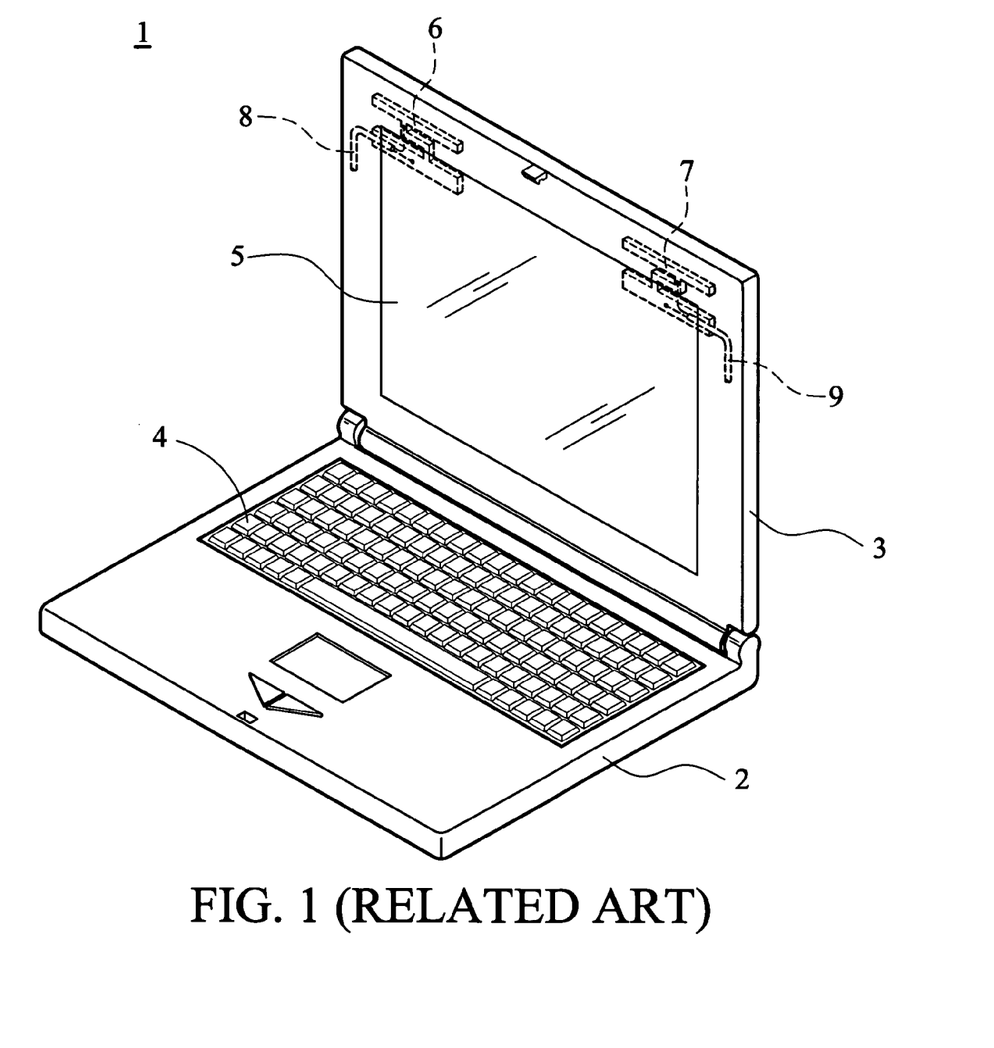
FIG. 1 shows a conventional antenna structure disposed in a notebook.

FIG. 1 shows conventional antenna structures utilized in a notebook (electronic device). The notebook 1 comprises a body 2, a cover 3, a control interface 4 and a screen 5. The control interface 4 is disposed on the body 2. The screen 5 is disposed on the cover 3. An antenna structure 6 is coupled to a cable 8. An antenna structure 7 is coupled to a cable 9. The antenna structure 6 and the antenna structure 7 are disposed in the cover 3. The antenna structure 6 transmits WWAN signal (comprising signals of frequencies in 900 MHz and 1800 MHz). The antenna structure 7 transmits WLAN signal (comprising signals of frequencies in 2 GHz and 5 GHz).

In the cover 3, the antenna structure 6 is separated from the antenna structure 7 to reduce interference therebetween. Thus, it is difficult to configure the antenna structure 6, the antenna structure 7 and other electronic elements (not shown) in the limited space in the cover 3.

BRIEF SUMMARY OF THE INVENTION

An antenna structure comprises a ground element, a first transmitting element and a second transmitting element. The first transmitting element transmits a first wireless signal, and comprises a first connecting portion and a first radiation portion. The first connecting portion is connected to the ground element and the first radiation portion. The second transmitting element transmits a second wireless signal and comprises a second connecting portion and a second radiation portion. The second connecting portion is connected to the ground element and the second radiation portion. A length of the second connecting portion is shorter than a length of the first connecting portion, and a length of the second radiation portion is shorter than a length of the first radiation portion.

The antenna structure of the invention utilizes closely disposed first transmitting element and the second transmitting element to transmit the first wireless signal, the second wireless signal, the third wireless signal and the fourth wireless signal. The invention transmits four different wireless signals with reduced antenna size, and the configuration inside the electronic device utilizing the same is therefore simplified.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The invention transmits WWAN signal and WLAN signal via one antenna structure, and reduces interference by modifying the shape thereof. Thus, the antenna structure is smaller, and the configuration inside the electronic device (for example, notebook) utilizing the same is simplified.

Figure 2:
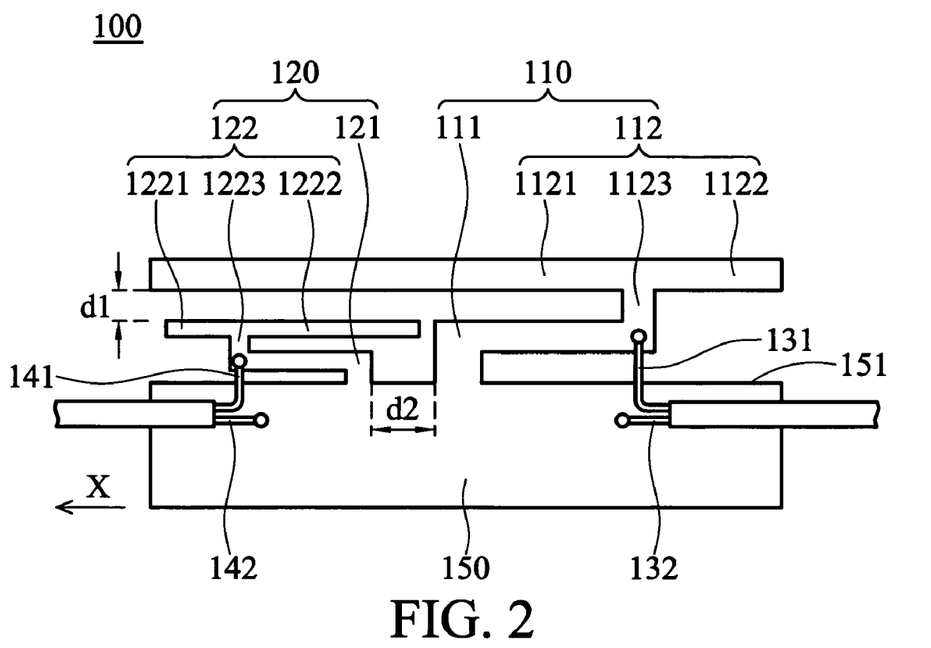
FIG. 2 shows an antenna structure of a first embodiment of the invention.

FIG. 2 shows an antenna structure 100 of a first embodiment of the invention, which comprises a ground element 150, a first transmitting element 110, a second transmitting element 120, a first signal line 131, a first ground line 132, a second signal line 141 and a second ground line 142. The first transmitting element 110 and the second transmitting element 120 are connected to the ground element 150. The first signal line 131 is coupled to the first transmitting element 110. The first ground line 132 is coupled to the ground element 150. The second signal line 141 is coupled to the second transmitting element 120. The second ground line 142 is coupled to the ground element 150. The first transmitting element 110 transmits a first wireless signal (900 MHz) and a third wireless signal (1800 MHz). The second transmitting element 120 transmits a second wireless signal (5 GHz) and a fourth wireless signal (2 GHz).

The first transmitting element 110 comprises a first L-shaped element (first connecting portion) 111 and a first radiation portion 112. The first L-shaped element 111 is connected to a first side 151 of the ground element 150, and a free end thereof extends in a second direction (−x). The second direction is parallel to the first side 151. The first radiation portion 112 comprises a first portion 1121, a second portion 1122 and a first conductive portion 1123. The first conductive portion 1123 is connected to the first L-shaped element 111. The first portion 1121 is connected to the first conductive portion 1123 extending in a first direction x. The first direction x is opposite to the second direction (−x). The second portion 1122 is connected to the first conductive portion 1123 extending in the second direction (−x).

The second transmitting element 120 comprises a second L-shaped element (second connecting portion) 121 and a second radiation portion 122. The second L-shaped element 121 is connected to the first side 151 of the ground element 150, and a free end thereof extends in a first direction x. The second radiation portion 122 comprises a third portion 1221, a fourth portion 1222 and a second conductive portion 1223. The second conductive portion 1223 is connected to the second L-shaped element 121. The third portion 1221 is connected to the second conductive portion 1223 extending in the first direction x. The fourth portion 1222 is connected to the second conductive portion 1223 extending in the second direction (−x).

The second radiation portion 122 is located between the ground element 150 and the first portion 1121 of the first radiation portion 112. A first gap dl is formed between the first portion 1121 and the second radiation portion 122 exceeding 0.6 mm. Thus, interference between the first radiation portion 112 and the second radiation portion 122 is reduced.

A second gap d2 is formed between fixing ends of the first L-shaped element 111 and the second L-shaped element 121 exceeding 2 mm. Thus, interference between the first transmitting element 110 and the second transmitting element 120 is reduced.

Figure 3A:
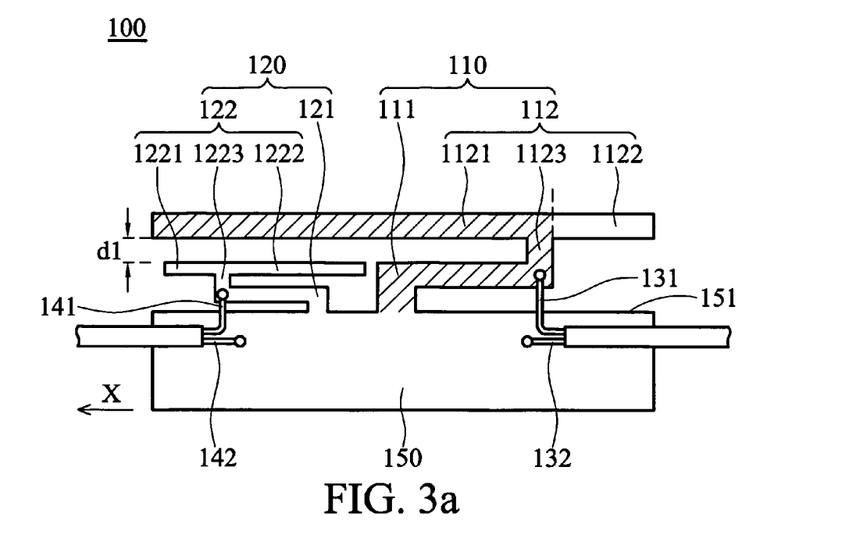
FIG. 3a shows the antenna structure of the first embodiment transmitting a first wireless signal.
Figure 3B:
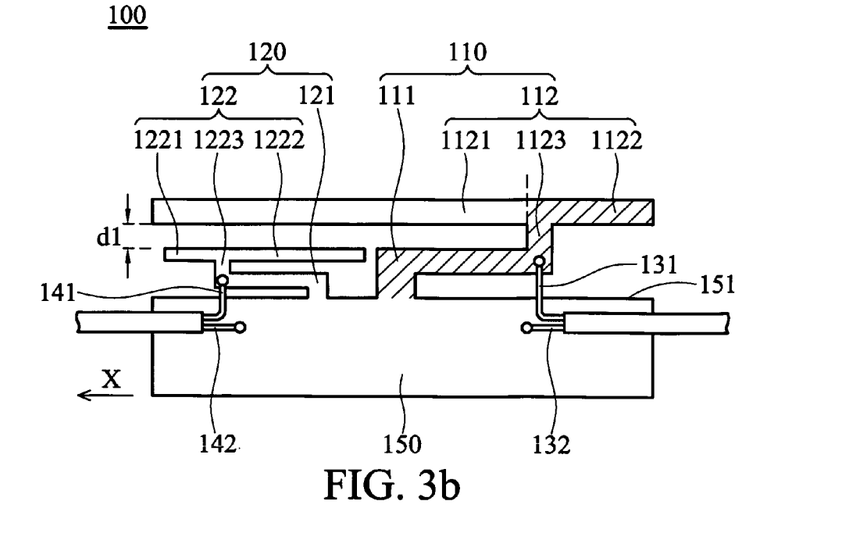
FIG. 3b shows the antenna structure of the first embodiment transmitting a third wireless signal.

With reference to FIG. 3a, when the antenna structure 100 transmits the first wireless signal (900 MHz), the second signal line 141 is idle, and the first signal line 131 transmits the first wireless signal. The first wireless signal is transmitted via the first portion 1121, the first conductive portion 1123 and the first L-shaped element 111. Although the second transmitting element 120 is also coupled to the first signal line 131, the first gap d1 spaces the first portion 1121 and the second radiation portion 122 and reduces interference produced by the second transmitting element 120. With reference to FIG. 3b, when the antenna structure 100 transmits the third wireless signal (1800 MHz), the second signal line 141 is idle, and the first signal line 131 transmits the third wireless signal, wherein the third wireless signal is transmitted via the second portion 1122, the first conductive portion 1123 and the first L-shaped element 111.

Figure 3C:
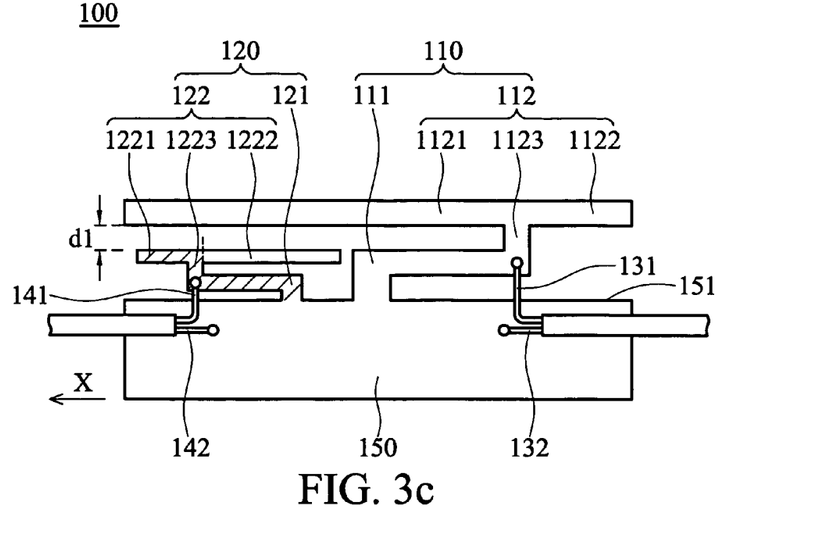
FIG. 3c shows the antenna structure of the first embodiment transmitting a second wireless signal.
Figure 3D:
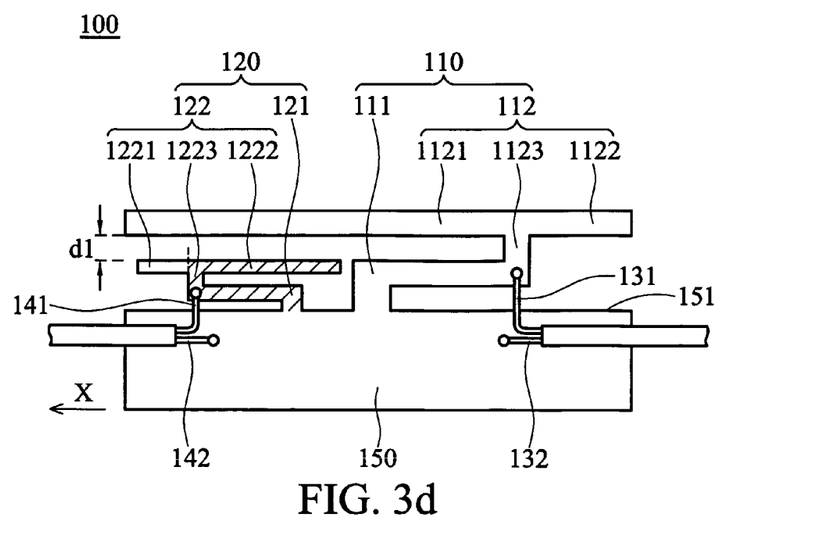
FIG. 3d shows the antenna structure of the first embodiment transmitting a fourth wireless signal.

With reference to FIG. 3c, when the antenna structure 100 transmits the second wireless signal (5 GHz), the first signal line 131 is idle, and the second signal line 141 transmits the second wireless signal. The second wireless signal is transmitted via the third portion 1221, the second conductive portion 1223 and the second L-shaped element 121. Although the first transmitting element 110 is also coupled to the second signal line 141, the first gap d1 separates the first portion 1121 and the second radiation portion 122 and reduces interference produced by the first transmitting element 110. With reference to FIG. 3d, when the antenna structure 100 transmits the fourth wireless signal (2 GHz), the first signal line 131 is idle, and the second signal line 141 transmits the fourth wireless signal, wherein the fourth wireless signal is transmitted via the fourth portion 1222, the second conductive portion 1223 and the second L-shaped element 121.

Figure 4A:
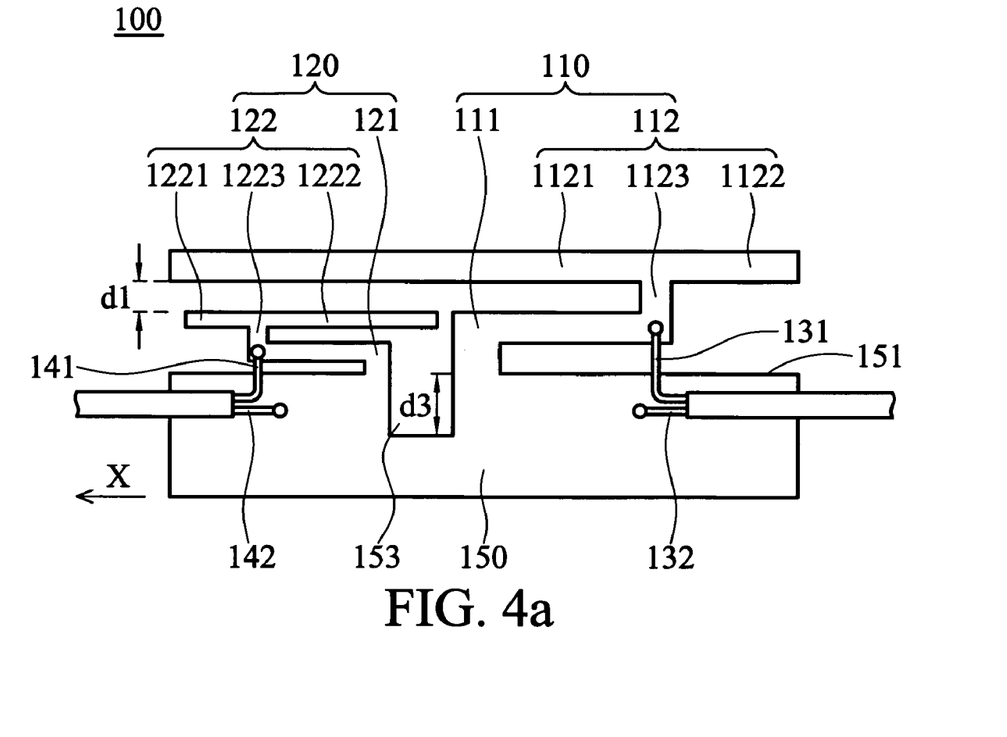
FIG. 4a shows a modified example of the first embodiment.

FIG. 4a shows a modified example of the invention, wherein a notch 153 with a depth d3 is formed on the first side 151 of the ground element 150. Via the notch 153, transmission of the antenna structure 100 is improved.

Figure 4B:
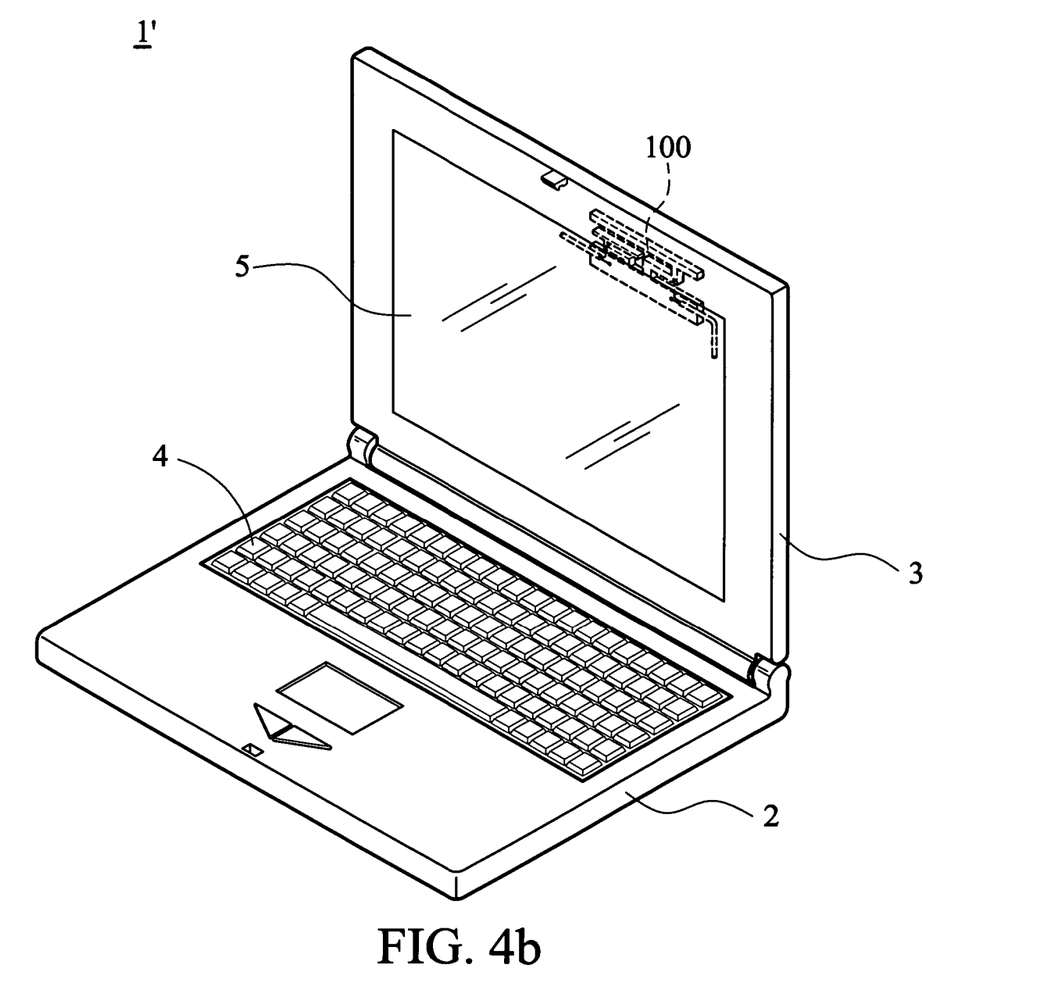
FIG. 4b shows the antenna structure of the first embodiment disposed in a notebook.

With reference to FIG. 4b, the antenna structure 100 is disposed in a notebook (electronic device) 1'. The notebook 1' comprises a body 2, a cover 3, a control interface 4 and a screen 5. The control interface 4 is disposed on the body 2. The screen 5 is disposed on the cover 3. The antenna structure 100 is disposed in the cover 3.

The antenna structure of the invention utilizes closely disposed first transmitting element and the second transmitting element to transmit the first wireless signal, the second wireless signal, the third wireless signal and the fourth wireless signal. The invention transmits four different wireless signals with reduced antenna size, and the configuration inside the electronic device utilizing the same is therefore simplified.

Figure 5:
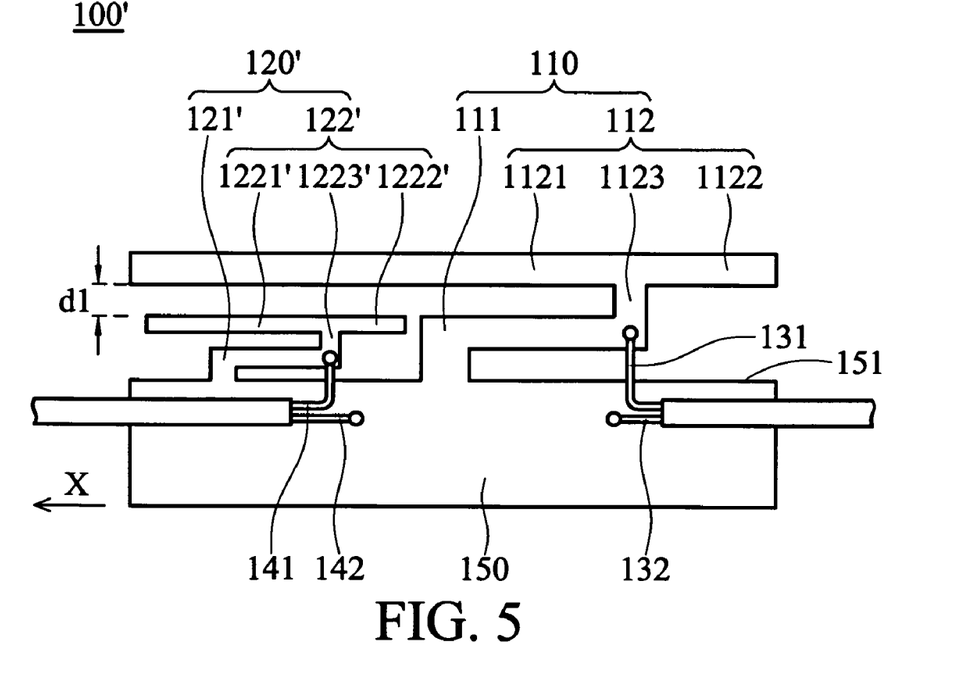
FIG. 5 shows an antenna structure of a second embodiment of the invention.

FIG. 5 shows an antenna structure 100' of a second embodiment of the invention, which differs from the antenna structure 100 in the shape of the second transmitting element 120' (comprising the second L-shaped element 121' and the second radiation portion 122'). The free end of the second L-shaped element 121' extends in the second direction (−x). The conductive portion 1223' is connected to the second L-shaped element 121'. The length of the third portion 1221' exceeds the length of the fourth portion 1222'. In the second embodiment, the third portion 1221' transmits the fourth wireless signal (2 GHz), and the fourth portion 1222' transmits the second wireless signal (5 GHz).

Figure 6A:
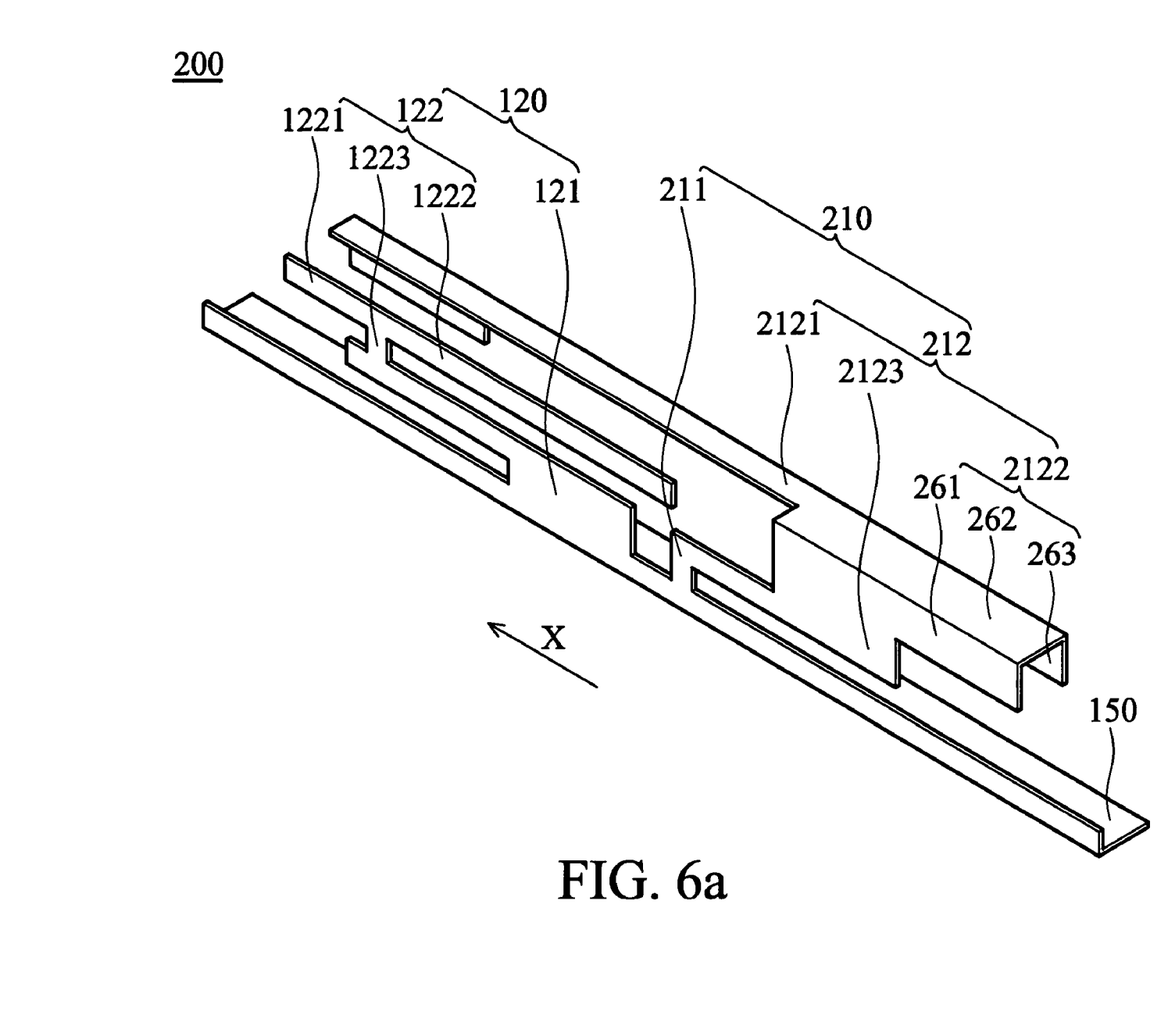
FIG. 6a shows an antenna structure of a third embodiment of the invention.

FIG. 6a shows an antenna structure 200 of the third embodiment of the invention, which differs from the antenna structure 100 in the shape of the first transmitting element 210 (comprises the first L-shaped element 211 and the first radiation portion 212). The first conductive portion 2123 is connected to the first L-shaped element 211. The second portion 2122 is connected to the first conductive portion 2123 extending in the second direction (−x). The first portion 2121 is connected to the second portion 2122 extending in the first direction x. The cross section of the second portion 2122 is inverse U-shaped, and comprises a first sheet 261, a second sheet 262 and a third sheet 263. The first sheet 261 is connected to the first conductive portion 2123 and the second sheet 262. The second sheet 262 is connected to the third sheet 263. The antenna structure 200 transmits the first wireless signal (900 MHz) via the first portion 2121, and transmits the third wireless signal (1800 MHz) via the second portion 2122.

With reference to FIG. 6a, the second conductive portion 1223 nears the free end of the second L-shaped element 121 to improve transmission.

Figure 6B:
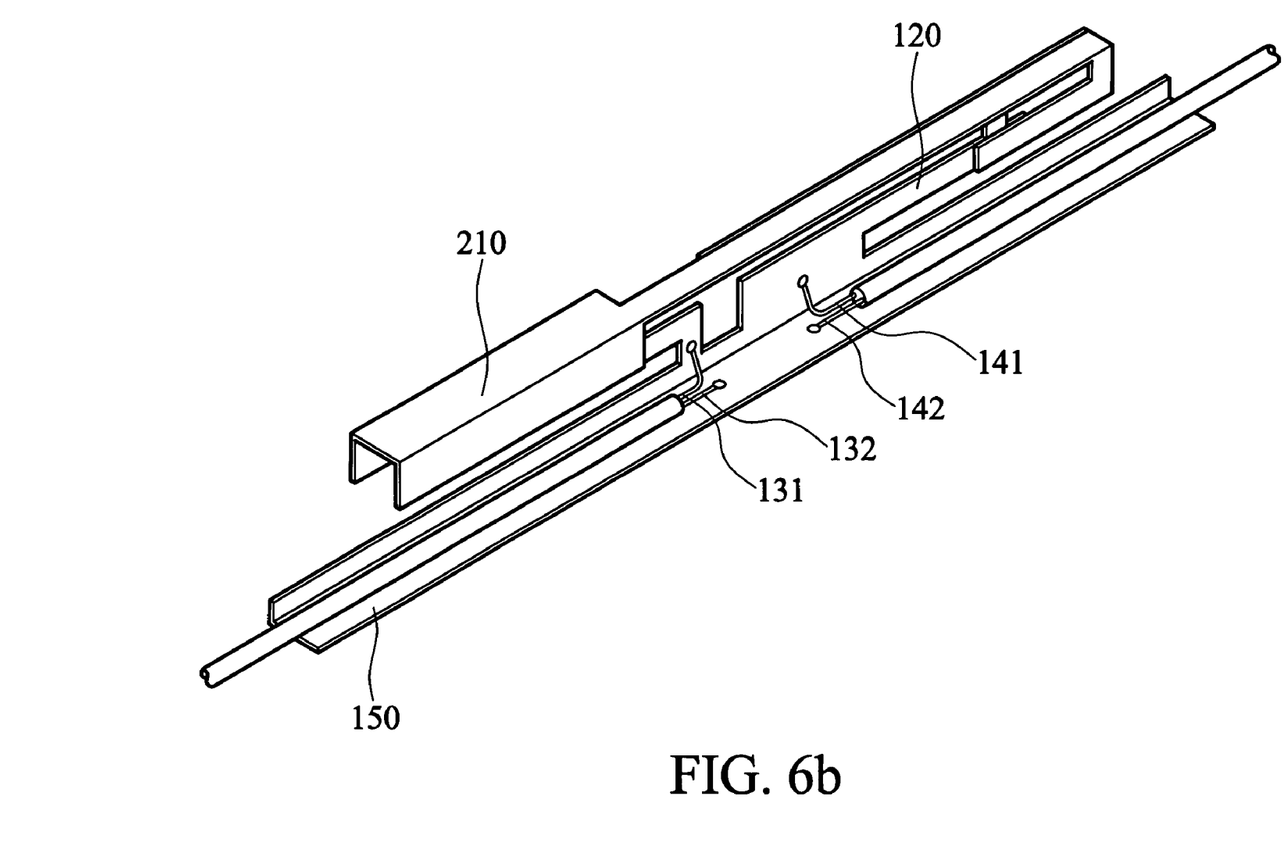
FIG. 6b shows a first signal line, a second signal line, a first ground line and a second ground line of the third embodiment.

With reference to FIG. 6b, in the third embodiment, the first signal line 131 is coupled to the first transmitting element 210, the first ground line 132 is coupled to the ground element 150, the second signal line 141 is coupled to the second transmitting element 120, and the second ground line 142 is coupled to the ground element 150.

In the third embodiment, when the distance between the first portion 2121 and the second radiation portion 122 is less than 0.6 mm, the antenna structure 200 still provides allowable transmission.

Figure 7:
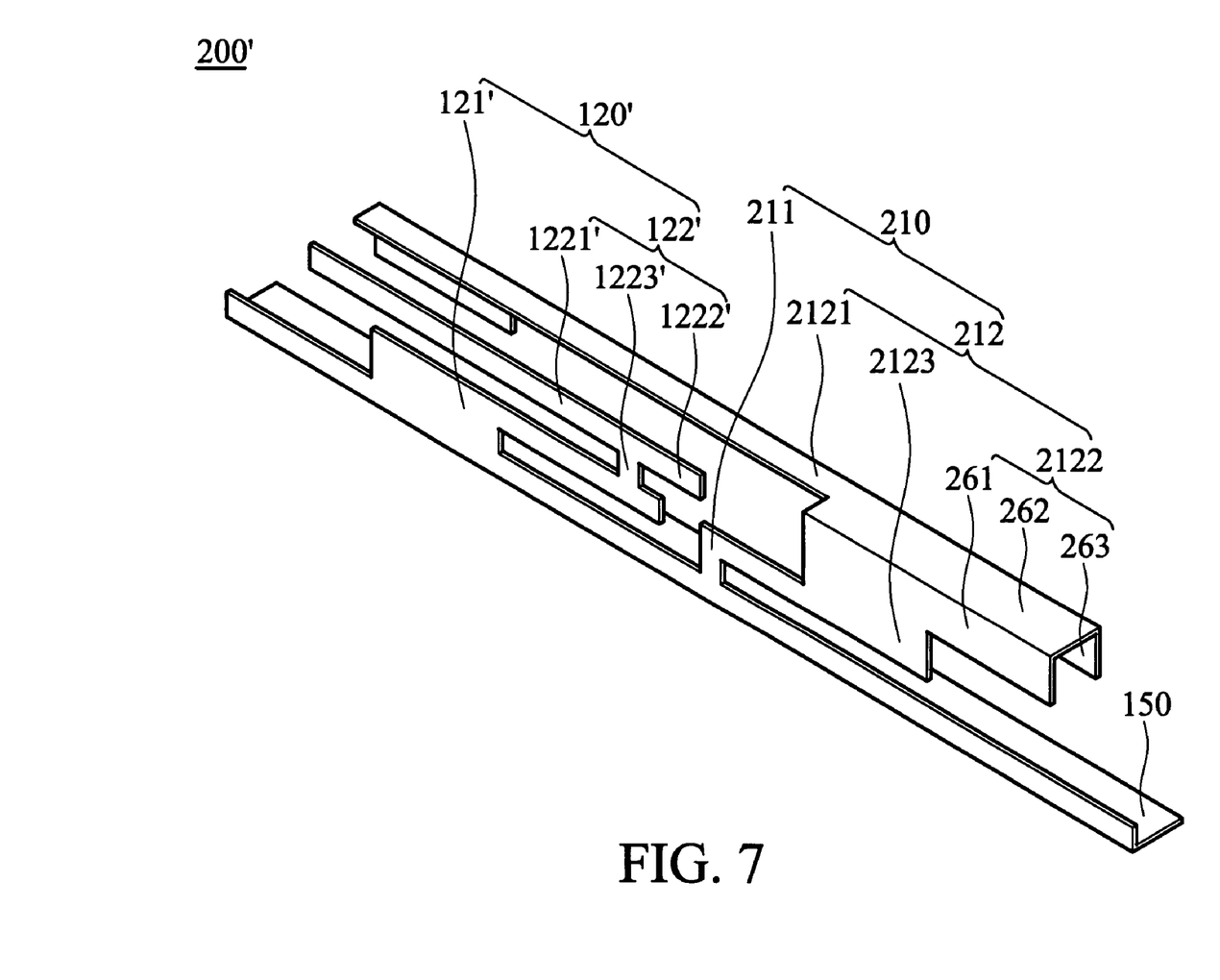
FIG. 7 shows an antenna structure of a fourth embodiment of the invention.

FIG. 7 shows an antenna structure 200' of a fourth embodiment of the invention, which differs from the third embodiment in the shape of the second transmitting element 120' (comprising the second L-shaped element 121' and the second radiation element 122'). The free end of the second L-shaped element 121' extends in the second direction (−x). The second conductive portion 1223' is connected to the second L-shaped element 121'. The length of the third portion 1221' exceeds the length of the fourth portion 1222'. In the fourth embodiment, the antenna structure 200' transmits the fourth wireless signal (2 GHz) via the third portion 1221', and transmits the second wireless signal (5 GHz) via the fourth portion 1222'.

In the third and fourth embodiments, the first sheet, the first conductive portion, the first L-shaped element and the second transmitting element are disposed on the same plane (first plane).

Figure 8:
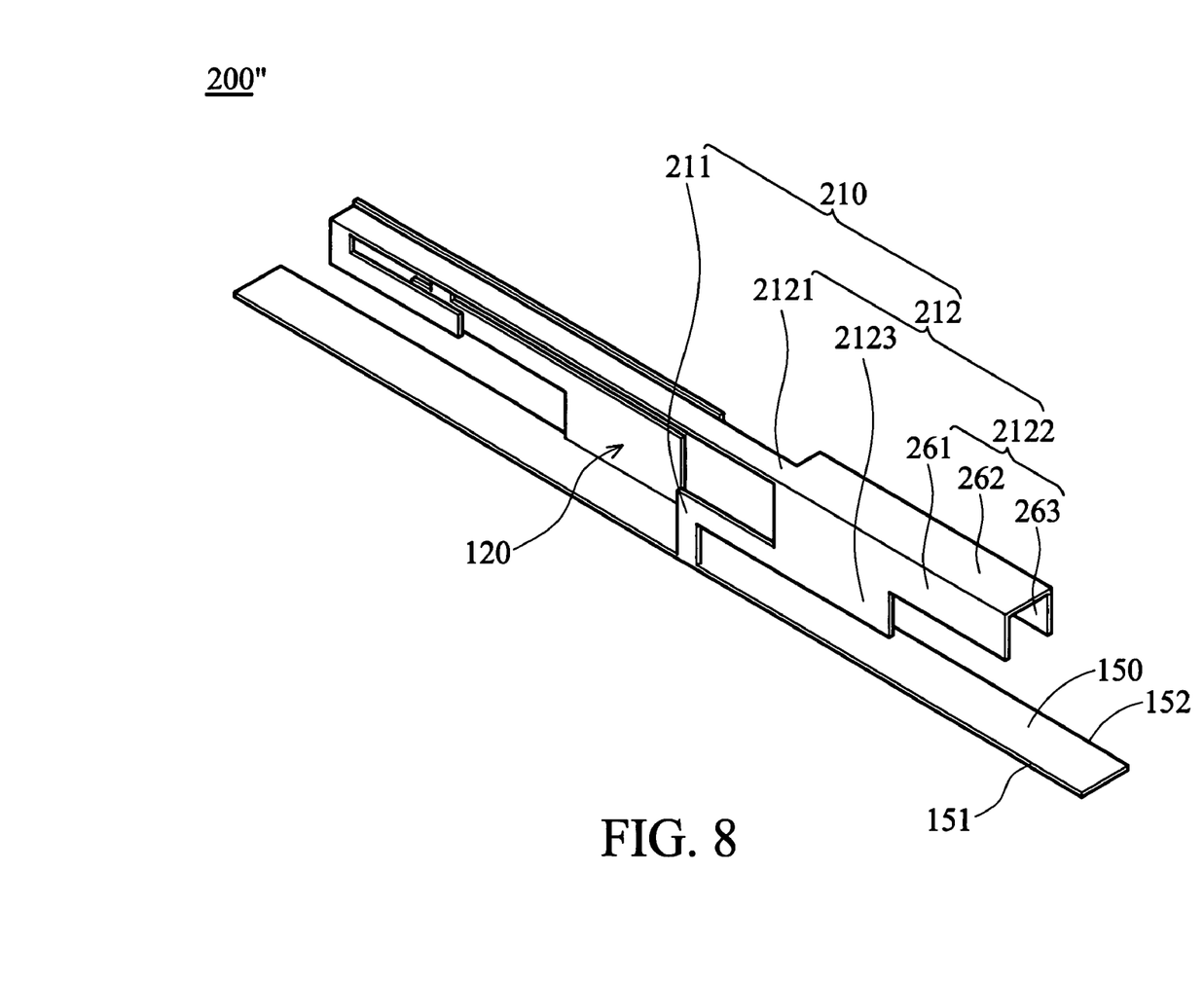
FIG. 8 shows an antenna structure of a fifth embodiment of the invention.

FIG. 8 shows an antenna structure 200" of a fifth embodiment of the invention, a modified form of the third and the fourth embodiment. In the fifth embodiment, the first sheet 261, the first conductive portion 2123 and the first L-shaped element 211 are on the first plane. The second transmitting element 120 is on a second plane. The first plane is parallel to the second plane. The first transmitting element 210 is connected to a first side 151 of the ground element 150, and the second transmitting element 120 is connected to a second side 152 of the ground element 150.

Figure 9:
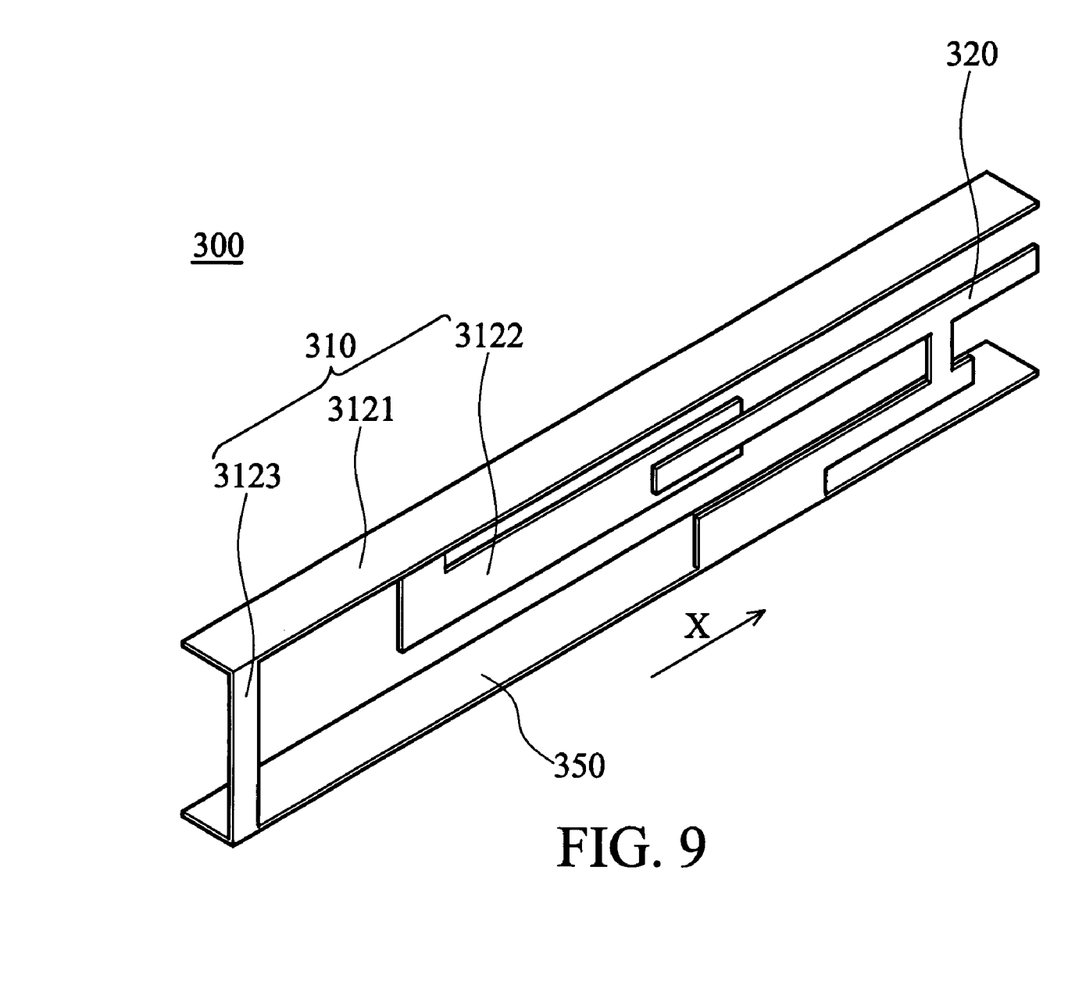
FIG. 9 shows an antenna structure of a sixth embodiment of the invention.

FIG. 9 shows an antenna structure 300 of a sixth embodiment of the invention, wherein the first transmitting element 310 comprises a first conductive 3123, a first portion 3121 and a second portion 3122. The first conductive portion 3123 is connected to the ground element 350. The first portion 3121 is connected to the first conductive portion 3123 extending in the first direction x. The second portion 3122 is L-shaped, and connected to the first portion 3121. A free end of the second portion 3122 extends in the first direction x. The second transmitting element 320 is connected to the ground element 350. The second transmitting element 320 is on a first plane, and the second portion 3122 is on a second plane. The first plane is parallel to the second plane.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An antenna structure, comprising:
    a ground element;
    a first transmitting element, transmitting a first signal, including a first connecting portion and a first radiation portion connected to the ground element via the first connecting portion, wherein the first radiation portion comprises a first portion and a second portion, the first portion and the second portion are connected to the first connecting portion, and the first portion and the second portion respectively extend in a first and a second directions; and
    a second transmitting element, transmitting a second signal, including a second connecting portion and a second radiation portion connected to the ground element via the second connecting portion, wherein the second radiation portion comprises a third portion and a fourth portion, the third portion and the forth portion are connected to the second connecting portion, and the third portion and the forth portion respectively extend in the first direction and the second direction, the second connecting portion is shorter than the first connecting portion, and the second radiation portion is shorter than the first radiation portion.

2. The antenna structure as claimed in claim 1, further comprising a first signal line, a first ground line, a second signal line and a second ground line, wherein the first signal line is coupled to the first transmitting element, the first ground line is grounded, the second signal line is coupled to the second transmitting element, and the second ground line is grounded.

3. The antenna structure as claimed in claim 1, wherein a first gap is formed between the first radiation portion and the second radiation portion, and the first gap is wider than 0.6 mm.

4. The antenna structure as claimed in claim 1, wherein a second gap is formed between the first connecting portion and the second connecting portion, and the second gap is wider than 2 mm.

5. The antenna structure as claimed in claim 1, wherein the first connecting portion comprises a first L-shaped element, and the second connecting portion comprises a second L-shaped element.

6. The antenna structure as claimed in claim 5, wherein a free end of the first L-shaped element extends in a second direction, a free end of the second L-shaped element extends in a first direction, and the second direction is opposite to the first direction.

7. The antenna structure as claimed in claim 1, wherein the first portion and the second portion are aligned on a straight line.

8. The antenna structure as claimed in claim 1, wherein the first portion is longer than the second portion, the first portion transmits the first wireless signal, and the second portion transmits a third wireless signal.

9. The antenna structure as claimed in claim 8, wherein the frequency of the first wireless signal is 900 MHz, and the frequency of the third wireless signal is 1800 MHz.

10. The antenna structure as claimed in claim 1, wherein the third portion is shorter than the fourth portion, the third portion transmits the second wireless signal, and the fourth portion transmits a fourth wireless signal.

11. The antenna structure as claimed in claim 10, wherein the frequency of the second wireless signal is 5 GHz, and the frequency of the fourth wireless signal is 2 GHz.

12. The antenna structure as claimed in claim 1, wherein the third portion is longer than the fourth portion, the third portion transmits the fourth wireless signal, and the fourth portion transmits a second wireless signal.

13. The antenna structure as claimed in claim 1, wherein the first transmitting element and the second transmitting element are located on a first plane.

14. The antenna structure as claimed in claim 1, wherein the ground element comprises a first side and a notch formed on the first side, the first transmitting element and the second transmitting element are disposed on the first side, and the notch is located between the first transmitting element and the second transmitting element.

15. The antenna structure as claimed in claim 1, wherein a distance between the second radiation element and the ground element is shorter than a distance between the first radiation element and the ground element.

16. A notebook, comprising:
    a housing;
    a screen, disposed on the housing;
    a control interface, disposed on the housing; and
    the antenna structure as claimed in claim 1, disposed in the housing.

17. An antenna structure, comprising:
    a ground element;
    a first transmitting element, transmitting a first wireless signal, comprising a first connecting portion and a first radiation portion, wherein the first connecting portion is connected to the ground element, the first radiation portion is connected to the first connecting portion, the first radiation portion comprises a first portion, a second portion and a first conductive portion, the first conductive portion is connected to the first connecting portion, the first portion is connected to the first conductive portion extending in a first direction, the second portion is connected to the first conductive portion extending in a second direction, and the first direction is opposite to the second direction; and
    a second transmitting element, transmitting a second wireless signal, comprising a second connecting portion and a second radiation portion, wherein the second connecting portion is connected to the ground element, and the second radiation portion is connected to the second connecting portion, wherein the second radiation portion comprises a third portion, a fourth portion and a second conductive portion, the second conductive portion is connected to the second connecting portion, the third portion is connected to the second conductive portion extending in the first direction, the fourth portion is connected to the second conductive portion extending in a second direction, the first direction is opposite to the second direction, and a distance between the second radiation element and the ground element is shorter than a distance between the first radiation element and the ground element.

18. An antenna structure, comprising:

a ground element;

a first transmitting element, transmitting a first signal, including a first connecting portion and a first radiation portion connected to the ground element via the first connecting portion, wherein the first radiation portion comprises a first portion, a second portion and a first conductive portion, the first conductive portion is connected to the first connecting portion, the second portion is connected to the first conductive portion extending in a second direction, and the first portion is connected to the second portion extending in a first direction; and a second transmitting element, transmitting a second signal, including a second connecting portion and a second radiation portion connected to the ground element via the second connecting portion, wherein the second radiation portion comprises a third portion, a fourth portion and a second conductive portion, the second conductive portion is connected to the second connecting portion, the third portion is connected to the second conductive portion, the fourth portion is connected to the second conductive portion extending in the second direction, the second connecting portion is shorter than the first connecting portion, and the second radiation portion is shorter than the first radiation portion.

19. The antenna structure as claimed in claim 18, wherein a cross section of the second portion is a U-shaped structure comprising a first sheet, a second sheet and a third sheet, the first sheet connected to the second sheet, the second sheet connected to the third sheet, the first sheet parallel to the third sheet, and the first sheet is connected to the first conductive portion.

20. The antenna structure as claimed in claim 19, wherein the first sheet, the first conductive portion, the first connecting portion and the second transmitting element are located on a first plane.

21. The antenna structure as claimed in claim 19, wherein the first portion is connected to the second sheet.

22. The antenna structure as claimed in claim 19, wherein the first sheet, the first conductive portion and the first connecting portion are located on a first plane, the second transmitting element is located on a second plane, and the first plane is parallel to the second plane.

* * * * *